United States Patent

White

[15] 3,676,666

[45] July 11, 1972

[54] MOUNTING OF SEALED BEAM HEADLAMPS

[72] Inventor: Jay E. White, Bloomfield Hills, Mich.

[73] Assignee: Reflex Corporation of Canada Limited, Amherstburg, Ontario, Canada

[22] Filed: July 16, 1970

[21] Appl. No.: 55,450

[52] U.S. Cl. .................................................240/41.5, 240/41.6
[51] Int. Cl. ........................................F21v 17/00, F21v 7/00
[58] Field of Search .................240/415 B, 41.5, 41.6, 52.1, 240/61.1–61.9, 149; 24/81 B, 73 B; 248/300, 311 D; 151/41.7, 41.75

[56] References Cited

UNITED STATES PATENTS

| 3,502,862 | 3/1970 | Hedgewick et al. | 240/41.5 |
|---|---|---|---|
| 3,385,961 | 5/1968 | Lemberger | 240/61.9 X |
| 2,760,540 | 8/1956 | Poupitch | 151/41.75 |
| 3,189,077 | 6/1965 | Willis, Jr. et al. | 85/51 X |
| 3,426,818 | 2/1969 | Derby | 151/41.75 |
| 2,697,862 | 12/1954 | Flora | 24/81 |
| 3,430,674 | 3/1969 | Forbush | 151/41.7 |
| 1,245,029 | 10/1917 | Robb et al. | 240/149 X |
| 2,600,883 | 6/1952 | King | 16/2 X |
| 1,600,818 | 9/1926 | Harbert | 248/300 X |

FOREIGN PATENTS OR APPLICATIONS

| 690,067 | 7/1964 | Canada | 240/41.5 |
|---|---|---|---|
| 1,050,743 | 12/1966 | Great Britain | 240/41 SB |

Primary Examiner—Charles A. Ruehl
Attorney—McGlynn, Reising, Milton & Ethington

[57] ABSTRACT

An automobile adjustable headlamp mounting having a one-piece plastic housing comprising a relatively thin annular spherical wall with a frusto-spherical inner surface and a frusto-spherical outer surface for engaging an opening in a mounting bracket. A peripheral rim on the annular wall has radially inwardly extending beads for engaging the flange of a sealed beam headlamp. The housing has integral spring tabs on the wall radially inwardly of the rim for engaging the flange of the headlamp to hold the latter in the housing between the bead and the spring tabs. Circumferentially positioned integral mounting brackets are located on the the annular wall. A novel spring metal clip is provided along the peripheral rim and cooperates with the beads on the flange of the housing to removably hold the headlamp in position. In addition, brackets on the housing are utilized to mount the housing on a mounting bracket. One of the mounting walls has a screw associated therewith which is held in position by a novel spring clip.

7 Claims, 8 Drawing Figures

PATENTED JUL 11 1972

INVENTOR
JAY E. WHITE, JR.
BY
Barnes, Kisselle, Raisch & Choate
ATTORNEYS

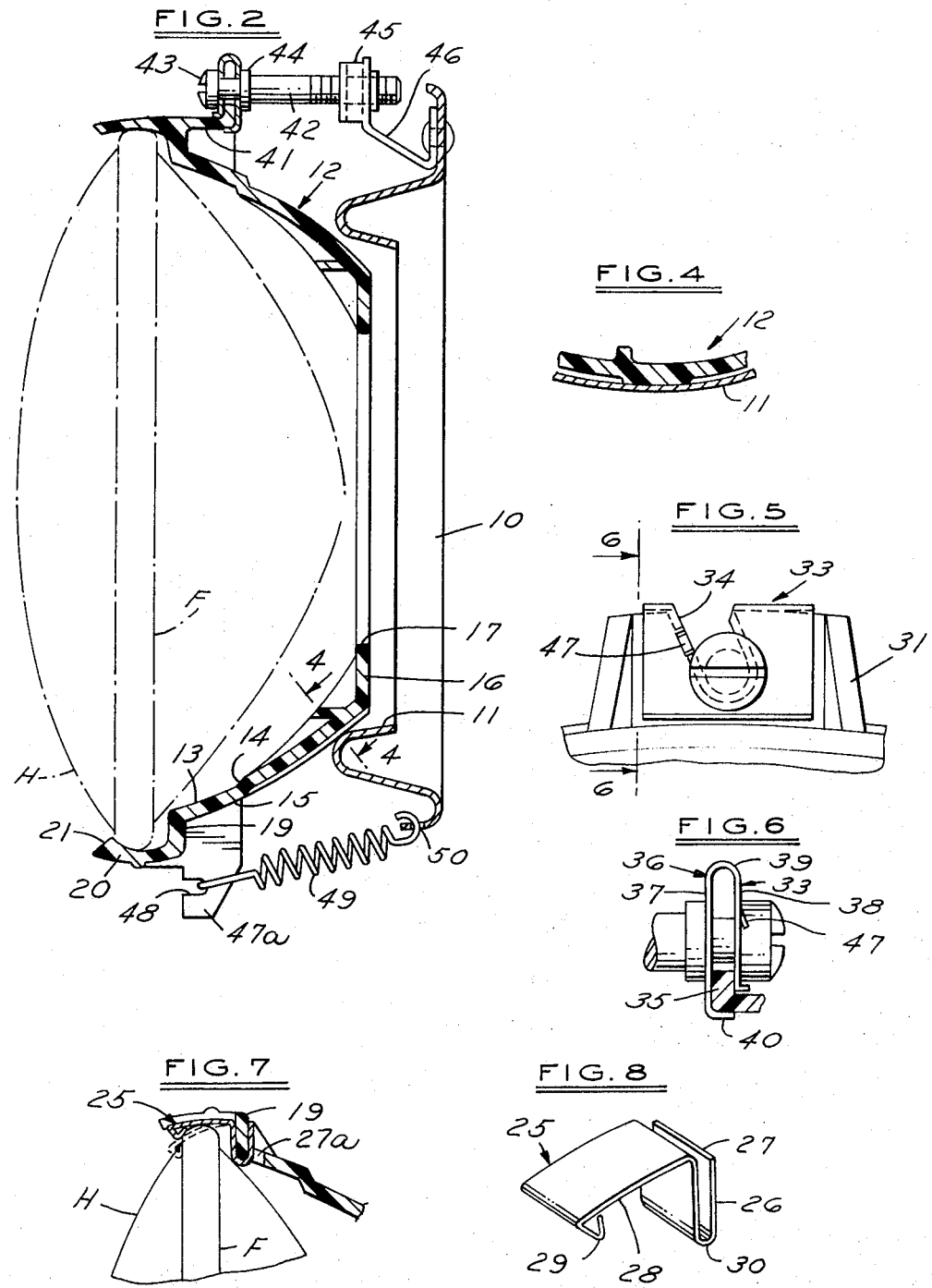

3,676,666

MOUNTING OF SEALED BEAM HEADLAMPS

This invention relates to the mounting of sealed beam headlamps.

BACKGROUND OF THE INVENTION

In the mounting of sealed beam headlamps on automobiles, it is conventional to utilize a three-piece mounting which includes a fixed bracket on the automobile, an adjustable bracket, which is mounted on the fixed bracket and has recesses for engaging the locating lugs on the flange of the sealed beam headlamp and surfaces for engaging the positioning surfaces on the flange of the headlamp, and a retaining flange that is provided on the exterior of the headlamp to hold the headlamp against the adjustable bracket.

In the patent to Hedgewick et al. U.S. Pat. No. 3,502,862, issued Mar. 24, 1970, there is disclosed and claimed a novel mounting of sealed beam headlamps that utilizes a plastic housing and achieves an accurate mounting of the headlamp at low cost with pleasing appearance.

Among the objects of the present invention are to provide a mounting of the type shown in the Hedgewick et al. U.S. Pat. No. 3,502,862 which includes novel means for facilitating removal and replacement of the headlamp; novel means for mounting the housing on the mounting bracket; and a novel clip for preventing displacement of a mounting screw with respect to an opening.

SUMMARY

A disclosed herein, an annular bracket having a circular opening therein is mounted on the automobile and a one-piece plastic housing is, in turn, adjustably mounted on the bracket. The one-piece plastic housing comprises a thin annular generally spherical wall which has axial extending ribs on the outer surface thereof engaging the sides of the opening in the bracket. The housing includes flanges through which bolts extend for adjustably mounting the housing on the bracket and springs extend between the housing and the bracket to hold the housing in position on the bracket. The housing has an annular peripheral wall with radially inwardly extending ribs or beads that engage the outer surface of the flange on the sealed beam headlamp. The housing also includes integral spring tabs that engage the axially inner surface of the flange on the sealed beam headlamp so that the sealed beam headlamp is supported within the housing. Each spring tab is provided with a recess for engaging the locating lug on the flange of the sealed beam headlamp and a pad for engaging the complementary surface on the flange of the sealed beam headlamp. The peripheral rim of the housing is slotted and one of the slots is made sufficiently wide to permit insertion of a tool such as a screwdriver to permit prying of the sealed beam headlamp out of the housing. A novel spring metal clip is provided along the peripheral rim and cooperates with beads on the flange of the housing to removably hold the headlamp in position. In addition, brackets on the housing are utilized to mount the housing on a mounting bracket. One of the mounting walls has a screw associated therewith which is held in position by a novel spring clip.

DESCRIPTION OF THE DRAWINGS

FIG. 2 is a sectional view taken along the line 2—2 in FIG. 1 showing the housing mounted in position.

FIG. 4 is a fragmentary sectional view taken along the line 4—4 in FIG. 2.

FIG. 5 is a fragmentary plan view of a portion of the mounting shown in FIG. 2.

FIG. 6 is a fragmentary sectional view taken along the line 6—6 in FIG. 5 showing the sealed beam headlamp in position.

FIG. 7 is a fragmentary sectional view taken along the line 7—7 in FIG. 1.

FIG. 8 is a perspective view of the clip shown in FIG. 7.

DESCRIPTION

Figure 1:
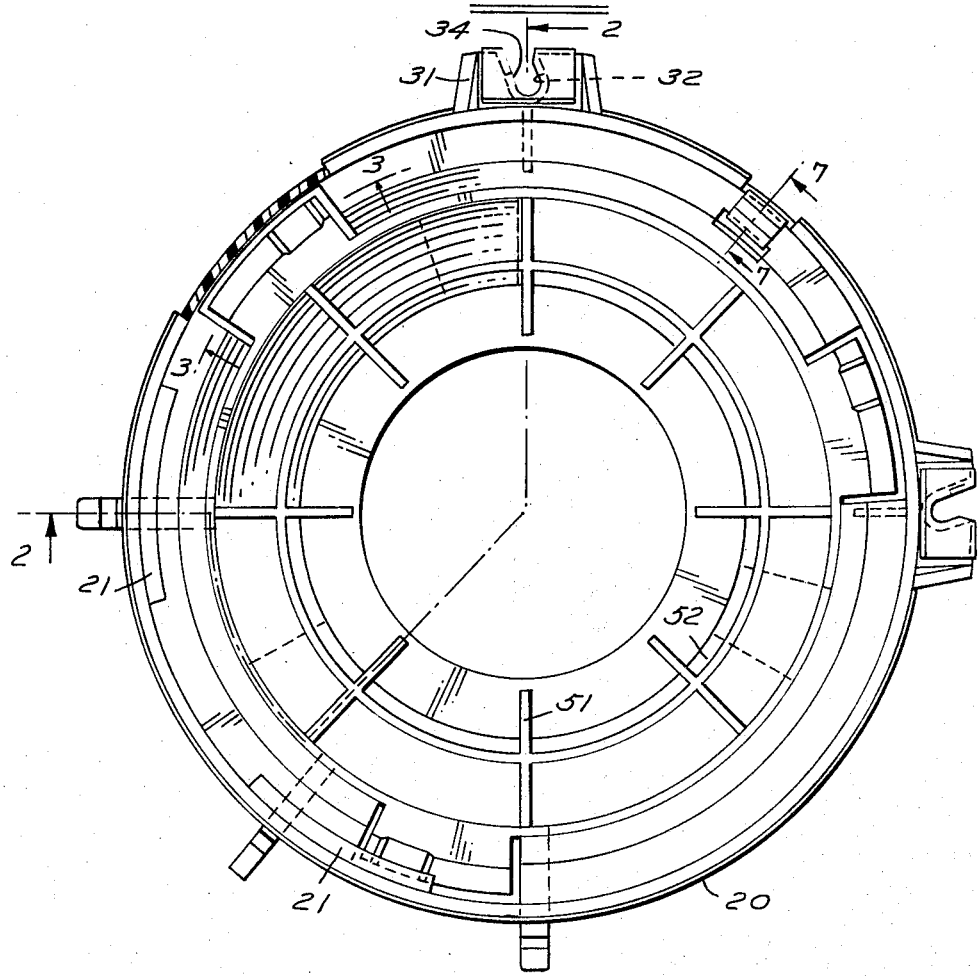
FIG. 1 is a part sectional plan view of a housing for mounting a headlamp.

Referring to FIGS. 1 and 2, the mounting for the headlamp embodying the invention comprises a support bracket 10 which may be the conventional bracket that forms a part of the automobile and includes a circular opening 11 defined by an inwardly bent portion of the sheet metal. In accordance with the invention, a one-piece plastic housing 12 is mounted on the support bracket 10. A satisfactory material for the housing comprises polypropylene.

Housing 12 includes a thin spherical annular wall 13 that has frusto-spherical inner and outer surfaces 14, 15. One end of the housing 12 is formed with a radially inwardly extending flange 16 that defines an opening 17.

At the other end of the wall 13, there is provided a radially outwardly extending offset portion 19 and a peripheral annular rim 20. Annular rim 20 is formed with radially inwardly extending bead portions 21 that are adapted to engage over the outer surface of the flange F on the sealed beam headlamp H.

Figure 3:
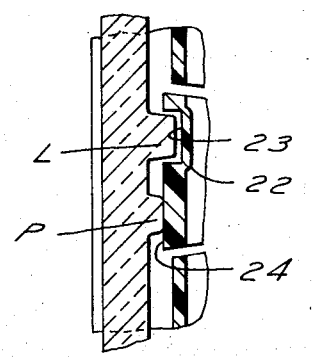
FIG. 3 is a fragmentary sectional view taken along the line 3—3 in FIG. 1.

As shown in FIGS. 1-3, the side wall of the housing 12 is slotted to define integral cantilever mounted spring tabs 22 which at their outer end are formed with recesses 23 and load bearing surface 24. As is well known, the headlamp H is provided with circumferentially spaced locating lugs L and bearing pads P (FIG. 3). In accordance with the invention, the locating lugs L extend into the recesses 23 to circumferentially locate the headlamp while the pads P bear against the surfaces 24 to support the headlamp. Thus, the headlamp is held between the bead portions 21 and the surfaces 24.

As shown in FIGS. 1, 7 and 8, at a point diametrically opposed between the bead portions 21, a portion of the peripheral rim 20 is cut away and a clip 25 of spring metal is provided on the offset portion 19. The clip includes a U-shaped portion 26 which has a leg with a free end 27 which projects through a slot 27a in the annular wall 13 adjacent the offset portion 19, and an integral portion 28 extending axially from the other leg of the U-shaped portion. The free end of the axial portion 28 is bent radially inwardly to form a V-shaped retaining portion 29. The spring clip is slipped over the offset portion 19 with the bight portion 30 engaging the inner periphery of the offset portion 19 and the retaining portion 29 extending inwardly. When the headlamp is to be inserted, one portion of flange F of the headlamp is first engaged with the bead portions 21 and then the remainder of flange F is swung axially inwardly to snap past the retaining portion 29.

The spring clip 25 thus functions to firmly hold the headlamp in position and yet permit its removal without distortion of the housing and without the use of excess force.

In addition, mounting flanges 31 are provided at two circumferentially spaced points on the housing 12. Each flange 31 is formed with an inclined slot 32. An adjustment screw retainer clip 33 having an inclined slot 34 which is of lesser width than the slot 32 is slipped over the wall 35 of the flange 31. Specifically, the retainer clip 33 is made of spring metal and includes a U-shaped portion 36 comprising legs 37, 38, each of which has slot 34 therein connected by a bight portion 39. Wall 35 includes a short flange 40 that snaps beneath an axially extending portion 41 of the peripheral rim 20.

An adjustment screw 42 having a head 43 and a collar 44 is adapted to be inserted in the slot 34 and the end thereof is threaded and received in a nut 45 mounted on a secondary bracket 46 on the main support bracket 10.

In accordance with the invention, a screw retaining tab 47 is struck outwardly from the wall 38 of the clip 36 and is adapted to frictionally engage the head 43 of the screw to lock the head 43 against removal from the slot 34.

At points diametrically opposed from the flanges 31, integral axial walls 47a having slots 48 are provided for receiving one end of a spring 49 which has its other end extending through an opening 50 in the bracket 10 to yieldingly hold the housing against the bracket. By threading the screws 42 inwardly and outwardly, the housing 12 and, in turn, the sealed beam headlamp mounted therein can be aimed.

As further shown in FIGS. 1 and 5, axially extending walls 51 are provided at circumferentially spaced points along the inner surface of the housing 12 and extend from a point beneath the offset portion 19 to the flange 16 and thereby provide rigidity to the housing. The housing further rigidified by a cylindrical wall 52 that interconnects the walls 51 at the area of juncture of the annular wall 13 and flange 16.

I claim:

1. Apparatus for supporting a sealed beam headlamp comprising: a one-piece plastic housing having an annular wall defining a recess for receiving a headlamp; a radially outwardly extending offset portion projecting from one end of said annular wall; a peripheral annular rim projecting axially from the end of said offset portions opposite said one end of said annular wall; radially inwardly extending bead portions formed on said rim; integral spring tab portions formed on said annular wall for cooperating with said bead portions to position a headlamp in said housing; and a spring clip mounted on said offset portion said spring clip extending axially from said offset portion in the direction of said rim, said spring clip being formed with a radially inwardly projecting retaining portion spaced from said offset portion for engaging a headlamp received in said recess and resiliently restraining the headlamp against removal from said housing.

2. Apparatus as claimed in claim 1 further including a slot formed in said annular wall adjacent said offset portion, said spring clip having a U-shaped portion mounted on said offset portion with one leg of said U-shaped portion projecting through said slot and having a free end, said spring clip having an axially extending portion projecting from the other leg of said U-shaped portion with said retaining portion formed on the end of said axially extending portion.

3. Apparatus as claimed in claim 1 further including a mounting flange integrally formed on said housing; a radial slot formed in said mounting flange; and an adjustment screw retainer clip resiliently mounted on said mounting flange.

4. Apparatus as claimed in claim 2 wherein said retainer clip includes a U-shaped portion receiving said mounting flange, a slot formed in each leg of said U-shaped portion, and a screw retaining tab struck from one leg of said U-shaped portion adjacent said slot.

5. Apparatus as claimed in claim 4 further including an adjustment screw received in the slots of said U-shaped portions with a head potion engaging one side of said U-shaped portion, and a collar spaced axially from said head portion and engaging the other side of said U-shaped portion, said retaining tab engaging said head portion.

6. Apparatus as claimed in claim 5 further including a main support bracket having an opening receiving said housing; and a secondary bracket on said main support bracket, said adjusting screw being threadedly engaged with said secondary bracket so that rotation of said screw adjusts the position of said housing with respect to said support bracket.

7. Apparatus for supporting a sealed beam headlamp comprising: a one piece plastic housing having an annular wall defining a recess for receiving a headlamp; a mounting flange integrally formed on said housing; an adjustment screw retainer clip mounted on said mounting flange and including a U-shaped portion receiving said mounting flange; aligned radial slots in each leg of said U-shaped portion and in said mounting flange; an adjustment screw received in said slots with a head portion engaging one side of said U-shaped portion and a collar spaced axially from said head portion and engaging the other side of said U-shaped portion; a retaining tab struck from one leg of said U-shaped portion and engaging said head portion to retain said screw in said slot; a main support bracket having an opening receiving said housing; and a secondary bracket on said main support bracket, said adjustment screw being threadedly engaged with said secondary bracket so that rotation of said screw adjusts the position of said housing with respect to said support bracket.

* * * * *